(12) United States Patent
Wolfe

(10) Patent No.: US 12,227,979 B2
(45) Date of Patent: Feb. 18, 2025

(54) DOOR OPERATOR CALIBRATION

(71) Applicant: Schlage Lock Company LLC, Carmel, IN (US)

(72) Inventor: John A. Wolfe, Cicero, IN (US)

(73) Assignee: Schlage Lock Company LLC, Carmel, IN (US)

( * ) Notice: Subject to any disclaimer, the term of this patent is extended or adjusted under 35 U.S.C. 154(b) by 637 days.

(21) Appl. No.: 17/387,179

(22) Filed: Jul. 28, 2021

(65) Prior Publication Data

US 2023/0031967 A1 Feb. 2, 2023

(51) Int. Cl.
*E05F 15/616* (2015.01)
*E05F 1/10* (2006.01)
*H02P 7/03* (2016.01)

(52) U.S. Cl.
CPC ............ *E05F 15/616* (2015.01); *E05F 1/105* (2013.01); *H02P 7/03* (2016.02); *E05Y 2201/434* (2013.01); *E05Y 2201/474* (2013.01); *E05Y 2201/626* (2013.01); *E05Y 2201/716* (2013.01); *E05Y 2400/32* (2013.01); *E05Y 2400/36* (2013.01); *E05Y 2400/40* (2013.01); *E05Y 2900/132* (2013.01)

(58) Field of Classification Search
CPC ......... E05F 15/616; E05F 1/105; E05F 15/63; E05F 3/102; H02P 7/03; E05Y 2201/434; E05Y 2201/474; E05Y 2201/626; E05Y 2201/716; E05Y 2400/32; E05Y 2400/36; E05Y 2400/40; E05Y 2900/132; E05Y 2201/71

See application file for complete search history.

(56) References Cited

U.S. PATENT DOCUMENTS 5,878,530 A    3/1999   Eccleston et al.
6,657,409 B1 * 12/2003  Leivenzon ......... G05B 19/4062
                                                 318/470
8,169,169 B2   5/2012   Hass et al.
(Continued)

FOREIGN PATENT DOCUMENTS

CN          101240681 A  *  8/2008  ............ E05F 15/603

OTHER PUBLICATIONS

International Search Report; International Searching Authority; International Application No. PCT/US2022/038685; Jan. 25, 2023; 2 pages.

(Continued)

*Primary Examiner* — Tung S Lau
(74) *Attorney, Agent, or Firm* — Taft Stettinius & Hollister LLP

(57) ABSTRACT

An exemplary method involves operating a door operator coupled to a door. The door operator includes a motor operable to move the door in at least one direction and a controller operable to control the motor. The method generally involves a calibration procedure including: with the door at a first position and the door having an initial speed, initiating, by the controller, measurement of a time duration; in response to the door reaching a target speed different from the initial speed, ceasing, by the controller, measurement of the time duration; and determining, by the controller, a maximum speed based on the time duration. The method further includes performing at least one operation based upon the maximum speed.

22 Claims, 9 Drawing Sheets

(56) References Cited

U.S. PATENT DOCUMENTS

| | | | |
|---|---|---|---|
| 9,000,901 B2* | 4/2015 | McKee | H02P 29/032 |
| | | | 296/146.4 |
| 10,208,520 B2 | 2/2019 | Long et al. | |
| 2003/0000777 A1* | 1/2003 | Lence Barreiro | B66B 13/22 |
| | | | 187/391 |
| 2006/0137251 A1* | 6/2006 | Imai | H02H 7/0851 |
| | | | 49/360 |
| 2007/0294961 A1 | 12/2007 | Reed et al. | |
| 2011/0094160 A1 | 4/2011 | Houser | |
| 2011/0257796 A1 | 10/2011 | Burris et al. | |
| 2017/0328108 A1* | 11/2017 | Long | E05F 15/70 |

OTHER PUBLICATIONS

Written Opinion of the International Searching Authority, International Searching Authority; International Application No. PCT/US2022/038685; Jan. 25, 2023; 4 pages.

* cited by examiner

DOOR OPERATOR CALIBRATION

TECHNICAL FIELD

The present disclosure generally relates to door operators, and more particularly but not exclusively relates to methods of calibrating an automatic door operator.

BACKGROUND

Door operators are commonly installed to doors to facilitate the opening and/or closing of the door. Certain limits and operating parameters for such installations are set by various standards and codes, such as those set by the Builders Hardware Manufacturers Association (BHMA). For example, the BHMA 156.19 standard for low-power auto-operators sets limits on the amount of kinetic energy that a door may have during normal opening and closing of the door. This kinetic energy is a function of door speed and the mass moment of inertia (MMI) of the door. In many conventional door operators, the task of enforcing the BHMA 156.19 standard falls to installers and/or maintenance personnel, which can result in poor compliance with the standard. For these reasons among others, there remains a need for further improvements in this technological field.

SUMMARY

An exemplary method involves operating a door operator coupled to a door. The door operator includes a motor operable to move the door in at least one direction and a controller operable to control the motor. The method generally involves a calibration procedure including: with the door at a first position and the door having an initial speed, initiating, by the controller, measurement of a time duration; in response to the door reaching a target speed different from the initial speed, ceasing, by the controller, measurement of the time duration; and determining, by the controller, a maximum speed based on the time duration. The method further includes performing at least one operation based upon the maximum speed. Further embodiments, forms, features, and aspects of the present application shall become apparent from the description and figures provided herewith.

DETAILED DESCRIPTION OF ILLUSTRATIVE EMBODIMENTS

Figure 1:
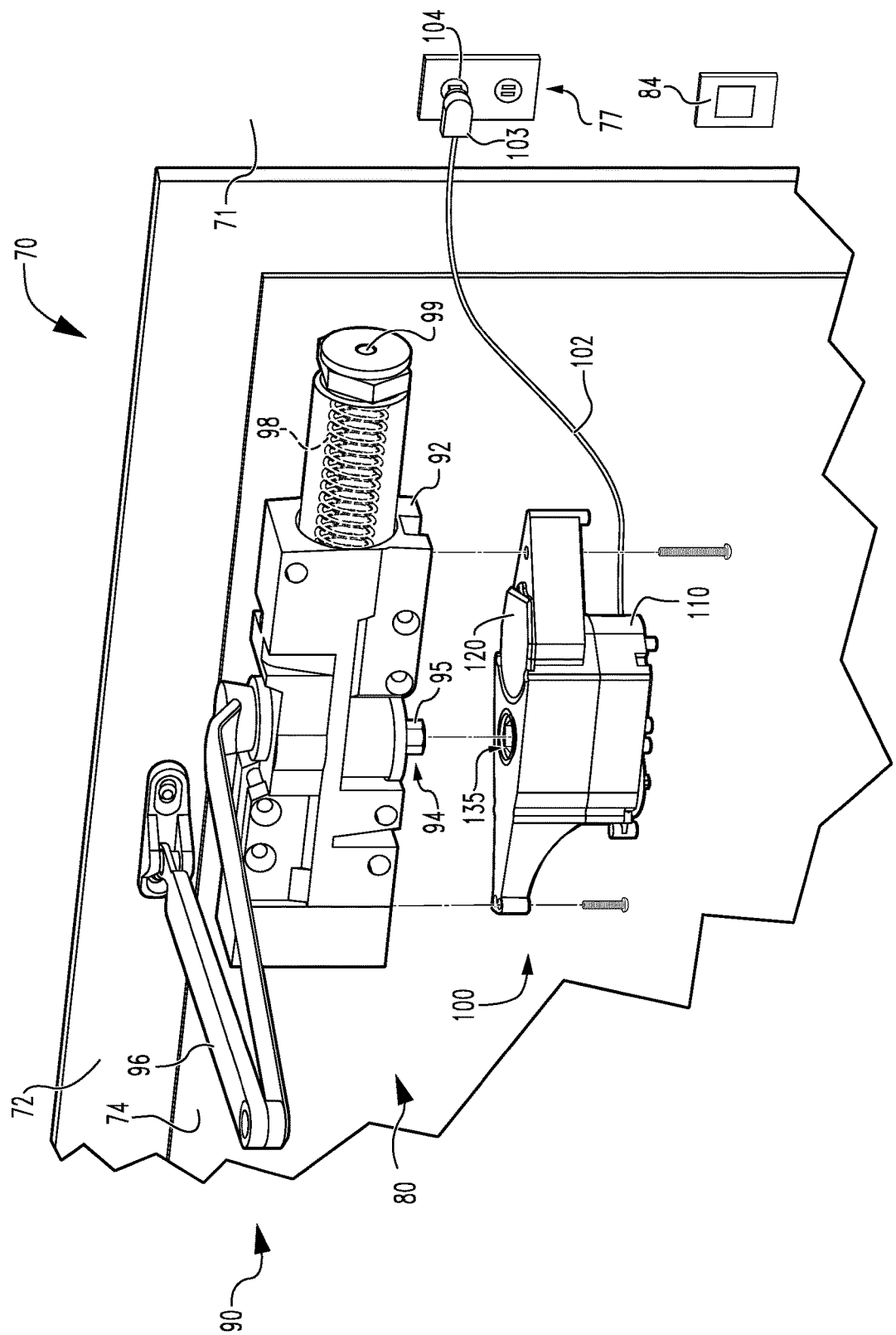
FIG. 1 is a partially-exploded perspective view of a closure assembly including a door operator according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a closure assembly 70 according to certain embodiments. The closure assembly 70 generally includes a door frame 72 and a door 74 swingingly mounted to the frame 72, for example by one or more hinges. The closure assembly 70 further includes a door operator 80 according to certain embodiments. The illustrated door operator 80 generally includes a traditional door closer 90 and a powered opening module 100 according to certain embodiments.

The door closer 90 generally includes a closer body 92, a pinion 94 rotatably mounted to the body 92, and an armature 96 connected with the pinion 94. The body 92 is mounted to one of the frame 72 or the door 74, and the armature 96 is connected between the pinion 94 and the other of the frame 72 or the door 74. In the illustrated form, the body 92 is mounted to the door 74, and the armature 96 is connected between the pinion 94 and the frame 72. In other embodiments, the body 92 may be mounted to the frame 72, and the armature 96 may be connected between the pinion 94 and the door 74.

During operation of the door closer 90, opening of the door 74 is correlated with rotation of the pinion 94 in a door-opening direction, and closing of the door 74 is correlated with rotation of the pinion 94 in a door-closing direction opposite the door-opening direction. Additionally, the closer 90 is configured to generate a biasing force urging the pinion 94 in the door-closing direction such that the closer 90 urges the door 74 toward its closed position. For example, the closer 90 may include a rack gear engaged with the pinion 94, and a spring 98 engaged with the rack gear. In such forms, opening of the door 74 drives the pinion 94 in the door-opening direction, thereby shifting the rack gear in a first direction and compressing the spring 98. During closing of the door 74, the spring 98 expands, thereby driving the rack gear in a second direction opposite the first direction and urging the pinion 94 in the door-closing direction, thereby urging the door 74 toward its closed position. While the spring 98 is illustrated as a single individual spring, it should be appreciated that the spring 98 may include plural individual springs. The closer 90 may further include one or more hydraulic passages through which a hydraulic fluid flows to modulate the opening and/or closing speed of the door 74. Door closers of this type are known in the art, and need not be described in detail herein.

In the illustrated form, the closer 90 further includes a spring adjustment mechanism 99 operable to adjust a preload of the spring 98, and thus the force profile of the spring 98. The force profile of the spring 98 may also depend upon additional or alternative factors, such as the stiffness of the spring 98 and/or the number of individual springs used. In certain forms, the spring adjustment mechanism 99 may comprise a screw that, when rotated, longitudinally drives a plate engaged with the spring 98 to selectively compress and expand the spring 98. Those skilled in the art will readily appreciate that adjustment of the preload on the spring 98 adjusts the closing torque imparted to the door 74 by the closer 90. While the illustrated operator 80 includes a spring adjustment mechanism 99 for adjusting the preload of the spring 98, it is also contemplated that the preload of the spring 98 may not necessarily be adjustable, and that the spring 98 may instead be provided with a fixed force profile. In further embodiments, such as those in which the door 74 is moved wholly by a motor, the spring 98 may be omitted.

Figure 2:
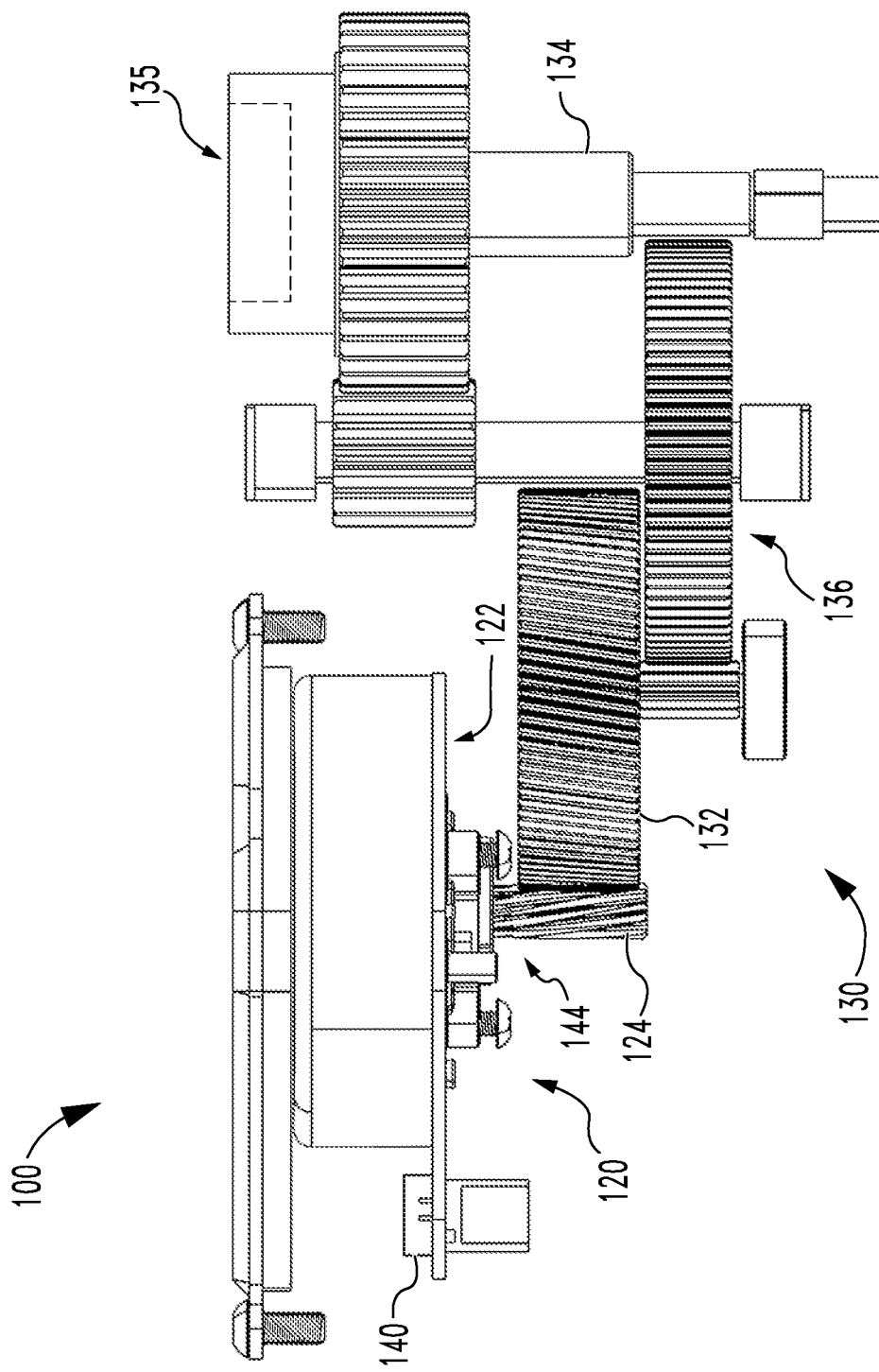
FIG. 2 is a side view of a portion of a door operator module according to certain embodiments.

With additional reference to FIG. 2, the powered opening module 100 generally includes a case 110, a motor 120 mounted in the case 110, a gear train 130 operably connected with the motor 120, and a control assembly 140 in communication with the motor 120. As described herein, the powered opening module 100 is configured to generate a force that urges the pinion 94 in the door-opening direction to at least assist in the opening of the door 74. In certain embodiments, the powered opening module 100 may be of the types described in U.S. patent application Ser. No. 17/225,615 filed Apr. 8, 2021, the contents of which are incorporated by reference in their entirety.

The module case 110 houses the internal components of the module 100, and includes an opening operable to receive an exposed end portion 95 of the pinion 94. The case 110 is configured for mounting to at least one of the closer body 92, the frame 72, or the door 74. In the illustrated form, the module case 110 is configured for mounting to the closer body 92. Additionally or alternatively, the module case 110 may be configured for mounting to the door 74. In certain embodiments, such as those in which the closer body 92 is mounted to the frame 72, the module case 110 may likewise be configured for mounting to the frame 72.

The motor 120 is mounted in the case 110, is drivingly connected with the gear train 130, and is in communication with the control assembly 140 such that the control assembly 140 is operable to control operation of the motor 120. The motor 120 includes a body portion 122 and a motor shaft 124 that is rotated by the body portion 122 under control of the control assembly 140. The motor shaft 124 is engaged with the gear train 130 such that rotation of the motor shaft 124 causes a corresponding rotation of the gear train 130. In certain embodiments, the motor 120 may, for example, be provided as a DC brushless motor. It is also contemplated that the motor 120 may be provided in another form, such as that of a brushed motor or a stepper motor. The motor 120 is operable to rotate the motor shaft 124 in at least a first direction, and may be further operable to rotate the motor shaft 124 in a second direction opposite the first direction. As described herein, rotation of the motor shaft 124 in the first direction is correlated with opening of the door 74, and rotation of the motor shaft 124 in the second direction is correlated with closing of the door 74.

The gear train 130 is movably mounted in the case 110 and is engaged with the motor 120 such that the motor 120 is operable to drive the gear train 130. The gear train 130 includes an input gear 132 engaged with the motor shaft 124 and an output shaft 134 engaged with the input gear 132 such that rotation of the motor shaft 124 is correlated with rotation of the output shaft 134. For example, the input gear 132 may be operably connected with the output shaft 134 via one or more additional gears 136. In the illustrated form, the gear train 130 is provided as a reduction gear set that provides the output shaft 134 with a greater torque and a lower speed than is provided to the motor shaft 124 by the motor 120. It is also contemplated that the gear train 130 may be provided in another form, or may be omitted (e.g., in embodiments in which the motor 120 directly rotates the output shaft 134).

The output shaft 134 includes a pinion interface 135 sized and shaped to receive the exposed end portion 95 of the pinion 94 for rotational coupling of the output shaft 134 with the pinion 94. For example, in embodiments in which the end portion 95 of the pinion 94 has a generally hexagonal outer geometry, the pinion interface 135 may have a corresponding hexagonal inner geometry sized and shaped to matingly receive the exposed end portion 95 of the pinion 94. When the module 100 is mounted to the closer 90, the pinion 94 and the output shaft 134 are coupled for joint rotation such that rotation of the motor shaft 124 is correlated with rotation of the pinion 94. More particularly, rotation of the motor shaft 124 in the first direction is correlated with rotation of the pinion 94 in the door-opening direction, and rotation of the motor shaft 124 in the second direction is correlated with rotation of the pinion 94 in the door-closing direction. As such, the first rotational direction for the motor shaft 124 may alternatively be referred to as the opening direction, and the second rotational direction for the motor shaft 124 may alternatively be referred to as the closing direction.

Figure 3:
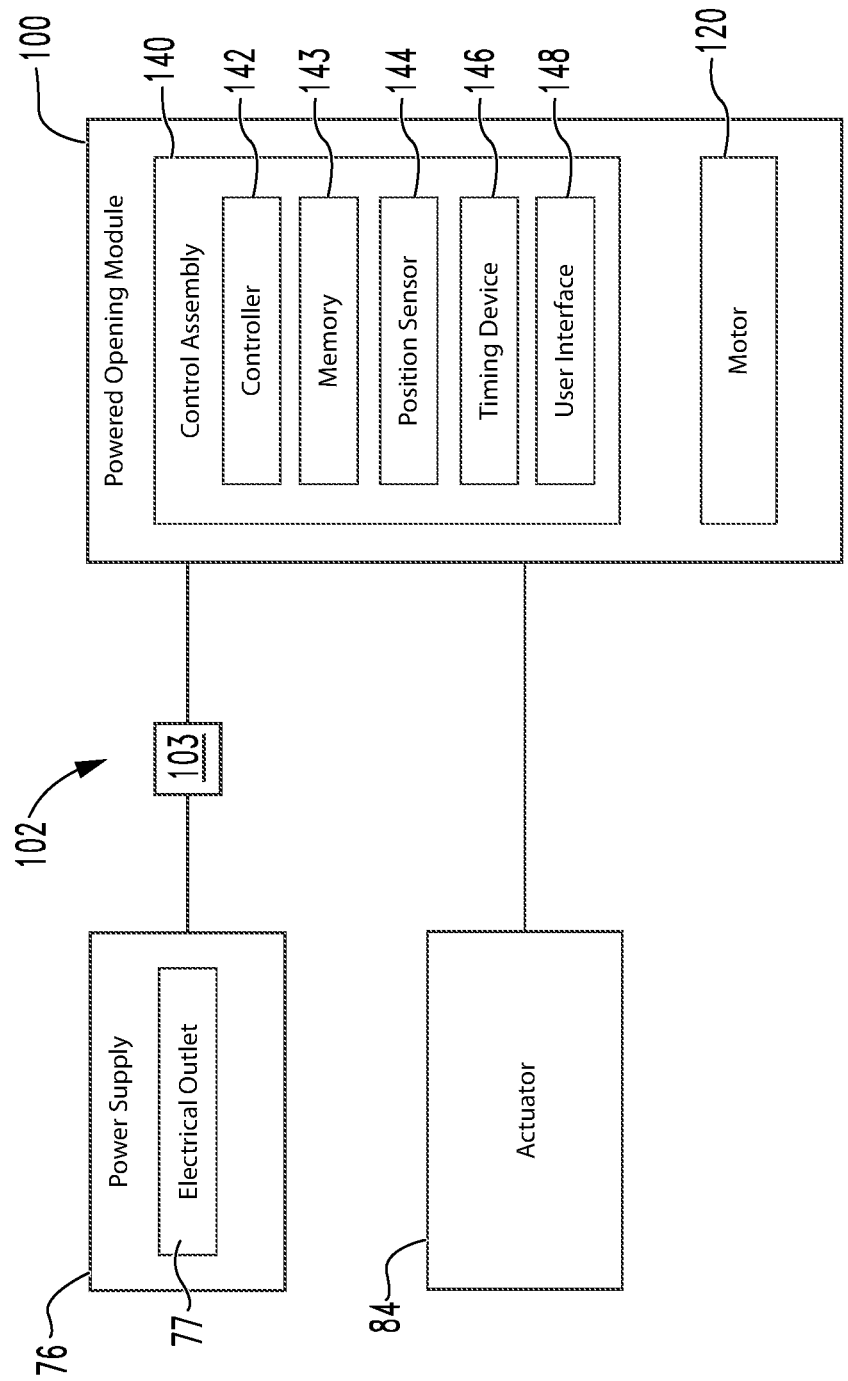
FIG. 3 is a schematic block diagram of a portion of the door operator illustrated in FIG. 1.

With additional reference to FIG. 3, the control assembly 140 is in communication with the motor 120 and an actuator 84, and is operable to control operation of the motor 120 based on information received from the actuator 84 using power drawn from an electrical power supply 76. In certain embodiments, the power supply 76 may be provided as an onboard power supply, such as one or more batteries. In other embodiments, the power supply 76 may be an external power supply, such as line power. For example, the module 100 may be provided with a cord 102 including a plug 104 that is plugged into a standard power outlet 77 in the vicinity of the door 74, where the power outlet 77 serves the function of the power supply 76. The cord 102 may include an adapter 103 that converts the line power to a power suitable for use by the module 100, such as about 24 volts (e.g., 24 volts+/−10%). The module 100 may be configured to operate under such reduced voltages, which may obviate the need for a skilled electrician installer by enabling the cord 102 to be plugged into a standard electrical outlet. In certain embodiments, the module 100 may be configured to receive electrical power and/or command signals via a Power-over-Ethernet connection.

As noted above, the control assembly 140 is in communication with the actuator 84, and is configured to control operation of the motor 120 based on information received from the actuator 84. More particularly, the actuator 84 is operable to transmit to the control assembly 140 an actuating signal in response to an actuating input provided by a user, and the control assembly 140 is configured to power the motor 120 to at least assist in opening the door 74 in response to receiving the actuating signal. In certain embodiments, the actuator 84 may be in wired communication with the control assembly 140. Additionally or alternatively, the actuator 84 may be in wireless communication with the control assembly 140.

The control assembly 140 generally includes a controller 142 and memory 143. The controller 142 may, for example, be provided in the form of a computing device, such as that described below with reference to FIG. 10. The memory 143 is a non-transitory computer-readable medium having instructions stored thereon, wherein the instructions, when executed by the controller 142, cause the door operator 80 to perform one or more of the actions described herein. As described herein, the memory 143 may further include one or more lookup tables and/or one or more equations that aid the operator 80 in determining the mass moment of inertia (MMI) of the door 74 and/or a parameter corresponding to the MMI.

The control assembly 140 may further include a position sensor 144 configured to sense a rotational position of the output shaft 134, a timing device 146, and/or a user interface 148 operable to cause the control assembly 140 to perform a calibration procedure as described herein. The user interface 148 may, for example, include one or more buttons or switches that, when operated by a user, cause the control assembly 140 to initiate the calibration procedure. As should be appreciated, the control assembly 140 may further include additional components, such as power conditioning circuitry configured to convert the power received from the power supply 76 to a form usable by the motor 120. As described herein, the controller 142 is configured to control operation of the motor 120 such that the powered opening module 100 generates a door-opening torque urging the pinion 94 in the door-opening direction to at least assist in opening the door 74 when a user actuates the actuator 84.

The position sensor 144 is configured to sense the rotational position of the output shaft 134, and thus the rotational position of the pinion 94. In certain embodiments, the position sensor 144 may, for example, be provided in the form of a rotary encoder. It is also contemplated that the position sensor 144 may be provided in another form, such as that of an absolute position sensor. In certain forms, the controller 142 may be operable to determine when the door 74 has reached a desired position (e.g., a fully open position) based on information received from the position sensor 144, and may control operation of the motor 120 based at least in part on the information received from the position sensor 144. In the illustrated form, the position sensor 144 is associated with the motor shaft 124, and is operable to determine the rotational position of the output shaft 134 (and thus of the pinion 94 and the door 74) by monitoring the rotational position of the motor shaft 124. It is also contemplated that the position sensor 144 may be associated with another component of the door operator 80 to monitor the position of the pinion 94 and the door 74.

Those skilled in the art will readily appreciate that while the rotational position of the pinion 94 is correlated with the angular position of the door 74, this correlation of positions depends upon a number of factors, such as the position of the operator 80 and the configuration of the armature 96. However, those skilled in the art will readily be able to correlate rotational positions of the pinion 94 with angular positions of the door 74. As such, the position of the door 74 can be determined based upon the information generated by the position sensor 144. From this position information, the speed of the door 74 can likewise be determined (e.g., by deriving the door position with respect to time).

The timing device 146 is operable to monitor times and may, for example, be provided in the form of a timer and/or a clock. As described herein, certain embodiments of the present application involve initiating measurement of a time duration and ceasing measurement of the time duration to thereby determine the time duration. In embodiments in which the timing device 146 includes a timer, initiating measurement of the time duration may involve initiating the timer, and ceasing measurement of the time duration may involve stopping the timer such that the information output by the timer provides the time duration. It is also contemplated that initiating the measurement may involve noting a start time on the clock, that ceasing the time measurement may involve noting an end time on the clock, and determining the time duration may involve subtracting the start time from the end time.

During operation of the illustrated closure assembly 70, the door 74 is biased toward its closed position by the conventional door closer 90. When a user approaches the closure assembly 70, the presence of the user and/or the intent of the user to open the door 74 may be detected by the actuator 84. Depending on the form of the actuator 84, the actuator 84 may detect the user in a touchless fashion (e.g., by detecting the presence of the user or the waving of a hand or foot), or may detect the presence of the user in response to being physically acted on by the user (e.g., by the user depressing a button of the actuator 84). Regardless of the manner in which the actuator 84 detects the presence of the user, the actuator 84 may transmit the actuating signal in response to detecting the user and/or the user's intent to open the door 74.

Upon receiving the actuating signal from the actuator 84 (e.g., via a wired or wireless communication connection), the control assembly 140 powers the motor 120 with power received from the power supply 76 such that the motor 120 drives the motor shaft 124 in the first or opening direction. As a result, the gear train 130 urges the output shaft 134 and the pinion 94 in the door-opening direction, thereby urging the door 74 toward its open position. In certain embodiments, the torque supplied by the powered opening module 100 is sufficient to drive the door 74 toward its open position against the closing force supplied by the closer 90. In other embodiments, the module 100 may merely provide a powered assist that aids the user in manually opening the door 74. In certain embodiments, the control assembly 140 may operate the motor 120 for a predetermined period of time after receiving the actuating signal. Additionally or alternatively, the control assembly 140 may operate the motor 120 until information generated by the position sensor 144 indicates that the door 74 has reached a desired position (e.g., a fully open position). When operation of the motor 120 ceases, the door 74 may return to its closed position under the urging of the conventional door closer 90.

In the illustrated form, the actuator 84 is external to the powered opening module 100. In such forms, the actuator 84 may sense the user and/or the user's intent to open the door 74 directly, for example by detecting the user, the user's gestures, or the user's activation of a pushbutton. It is also contemplated that the actuator 84 may sense the user's intent to open the door 74 in another manner. For example, the actuator 84 may be provided within the powered opening module 100, and may infer the user's intent to open the door 74 in response to an initial movement of the door 74 toward its open position. In response to detecting such initial movement of the door 74 (e.g., via the position sensor 144), the control assembly 140 may operate the motor 120 to provide the user with a powered opening assist.

As should be evident from the foregoing, the control assembly 140 is operable to control the motor 120 to exert a force on the door 74 in at least one direction (i.e., the opening direction and/or the closing direction). As described herein, the control assembly 140 is further operable to perform a calibration procedure that may aid in determining the amount of current to be supplied to the motor 120 during a powered opening operation and/or a powered closing operation. While such calibration will generally be described with specific reference to the door operator 80 illustrated in FIGS. 1-3, it should be appreciated that the processes described herein may be performed in conjunction with door operators having additional or alternative features. For example, while the illustrated door operator 80 includes a conventional hydraulic closer 90 and a powered opening module 100 releasably mounted to the closer 90, it is also contemplated that a door operator according to certain embodiments may be provided as an original construction in which one or more features of the closer 90 and/or one or more features of the powered opening module 100 are provided together as a unit. In certain forms, a door operator may omit the spring 98 and/or the hydraulic features such that both opening and closing of the door 74 are performed primarily or wholly by a motor.

During powered opening and/or powered closing of the door 74, it may be desirable to ensure that the kinetic energy of the door 74 remains below a threshold value. For a pivoting door, the kinetic energy can be found according to the equation $$K = \frac{1}{2} \cdot MMI \cdot \omega^2,$$

where K is the kinetic energy, MIMI is the mass moment of inertia of the door 74, and $\omega$ is the angular speed of the door 74. Thus, for a given door 74 with a known MMI, the kinetic energy K can be kept below a threshold value $K_{max}$ by ensuring that the angular speed of the door does not exceed a maximum speed $\omega_{max}$, which can be calculated as $\omega_{max} = \sqrt{2 \cdot K_{max}/MMI}$.

In order to ensure that the angular speed $\omega$ of the door 74 remains below the maximum speed $\omega_{max}$, it may be desirable to determine the MMI of the door 74. As described herein, however, it may be unnecessary to calculate the actual MMI of the door 74, and certain embodiments of the present application may instead involve measuring or calculating a parameter that merely corresponds to (e.g., is proportional to) the MMI.

Figure 4:
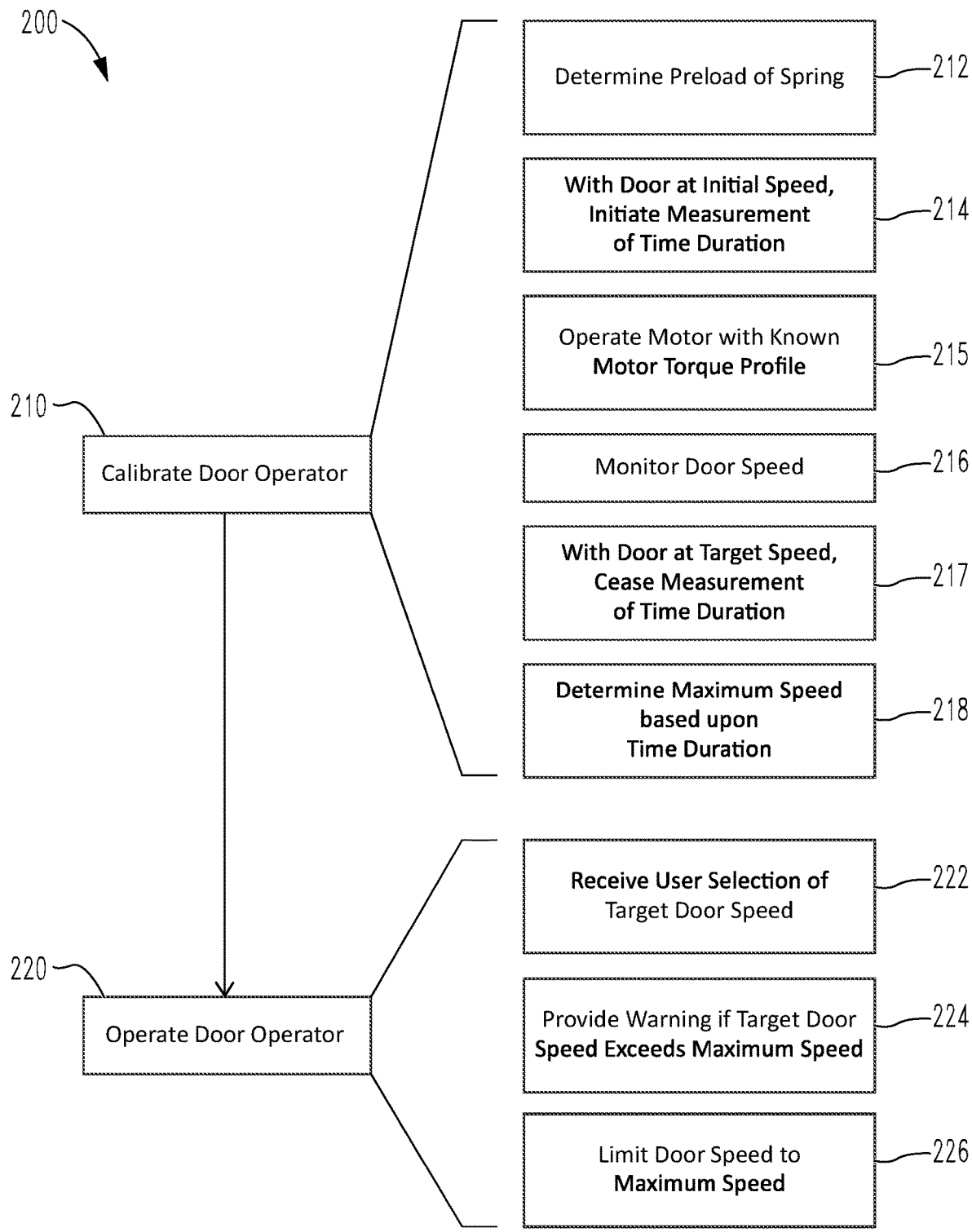
FIG. 4 is a schematic flow diagram of a process according to certain embodiments.

With additional reference to FIG. 4, an exemplary process 200 that may be performed using the door operator 80 is illustrated. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 200 may be performed wholly by control assembly 140, or that the blocks may be distributed among one or more of the elements and/or additional devices or systems that are not specifically illustrated in FIGS. 1-3. Additionally, while the blocks are illustrated in a relatively serial fashion, it is to be understood that two or more of the blocks may be performed concurrently or in parallel with one another. Moreover, while the process 200 is described herein with specific reference to the closure assembly 70 and door operator 80 illustrated in FIGS. 1-3, it is to be appreciated that the process 200 may be performed with closure assemblies 70 and/or door operators 80 having additional and/or alternative features.

The process 200 generally involves a calibration procedure 210 and an operation procedure 220. As described herein, the calibration procedure 210 generally involves determining a maximum speed for the door 74, and the operation procedure 220 generally involves performing at least one operation based upon the maximum speed.

The calibration procedure 210 may begin in response to a calibration-initiating input, such as one provided via the user interface 148. For example, a user may press and hold a button of the user interface 148 until the calibration procedure 210 begins.

In certain embodiments, the calibration procedure 210 may involve block 212, which generally involves determining a force profile of the spring 98. As noted above, the closer 90 may include an adjustment mechanism 99 by which the preload of the spring 98 may be adjusted. For example, the screw of the adjustment mechanism 99 may have a first position corresponding to minimum preload and a second position corresponding to maximum preload, and may be rotatable a known number of times (e.g., about thirty) to move between the first position and the second position. Block 212 may involve determining the number of rotations that have been performed on the screw to adjust the preload of the spring 98.

In certain forms, block 212 may involve driving the door to a predetermined open position, operating the motor 120 with a holding current to maintain the door in the predetermined open position, and reducing the holding current until the door 74 begins to move toward its closed position under force of the spring 98. Such movement of the door 74 may, for example, be detected via the position sensor 144. Block 212 may further involve determining the force profile of the spring 98 based on the reduced holding current that was provided to the motor 120 when the door 74 begin to move. As described herein, this force profile may be utilized in one or more other blocks of the calibration procedure 210. It is also contemplated that block 212 may be omitted, for example in embodiments in which the force profile of the spring 98 is known and/or fixed, and/or embodiments in which the spring 98 is omitted and closing of the door 74 is performed by the motor 120.

The calibration procedure 210 includes block 214, which generally involves initiating measurement of a time duration. Block 214 may, for example, be performed with the door 74 at a predetermined first position and with an initial speed $\omega_{initial}$. The door 74 being at the first position and the initial speed $\omega_{initial}$ may, for example, be determined based on information generated by the position sensor 144. In certain embodiments, the initial speed $\omega_{initial}$ may be a non-zero speed, while in other embodiments the initial speed $\omega_{initial}$ may be zero.

The calibration procedure 210 may further include block 215, which generally involves operating the motor 120 with a known motor torque profile such that the door speed $\omega_{door}$ changes. In certain embodiments, operating the motor 120 with the known motor torque profile may involve supplying no current to the motor 120. In other embodiments, operating the motor 120 with the known motor torque profile may involve supplying the motor 120 with current.

The calibration procedure 210 may further include block 216, which generally involves monitoring the door speed $\omega_{door}$. Block 216 may, for example, involve monitoring the information generated by the position sensor 144, from which the current position of the door 74 may be determined, for example as described above. Those skilled in the art will readily appreciate that the door speed $\omega_{door}$ corresponds to the rotational speed of the pinion 94, and can be calculated (e.g., derived) based on the position information generated by the position sensor 144.

The calibration procedure 210 further includes block 217, which generally involves ceasing measurement of the time duration in response to the door 74 reaching a threshold speed $\omega_{threshold}$. With the measurement stopped, the duration of time Δt for the door 74 to accelerate or decelerate from the initial speed $\omega_{initial}$ to the threshold speed $\omega_{threshold}$ is known. As will be appreciated by those skilled in the art, an angular acceleration α can thus be calculated according to the equation $\alpha = \Delta\omega/\Delta t$, where Δω is the difference between the initial speed $\omega_{initial}$ and the threshold speed $\omega_{threshold}$, each of which has a known value. Those skilled in the art will further appreciate that the angular acceleration can also be calculated according to the equation $\alpha = \tau/MMI$ where τ is the torque applied to the door 74 by the operator 80, which torque corresponds to the motor torque profile provided to the motor 120. Combining the prior two equations indicates that $\tau/MMI = \Delta\omega/\Delta t$, which can be rearranged as $\Delta t = \Delta\omega \cdot MMI/\tau$. Thus, for a given difference Δω between the initial speed $\omega_{initial}$ and the threshold speed $\omega_{threshold}$, and a given motor torque profile, the time duration Δt is proportional to the MMI of the door 74. As such, certain embodiments of the processes described herein may utilize the time duration Δt as a proxy for the MMI. It is also contemplated that the processes herein may involve calculating an intermediate parameter proportional to both the time duration Δt and the door MMI, or may involve calculating the MMI itself.

The calibration procedure 210 further includes block 218, which generally involves determining the maximum speed $\omega_{max}$ based upon the time duration Δt. In certain embodiments, one or more maximum speeds $\omega_{max}$ may be stored in one or more lookup tables stored in memory 143, for example as described herein. In certain embodiments, one or more maximum speeds $\omega_{max}$ may be determined computationally by the controller 142 based at least in part on the time duration Δt.

Figure 5:
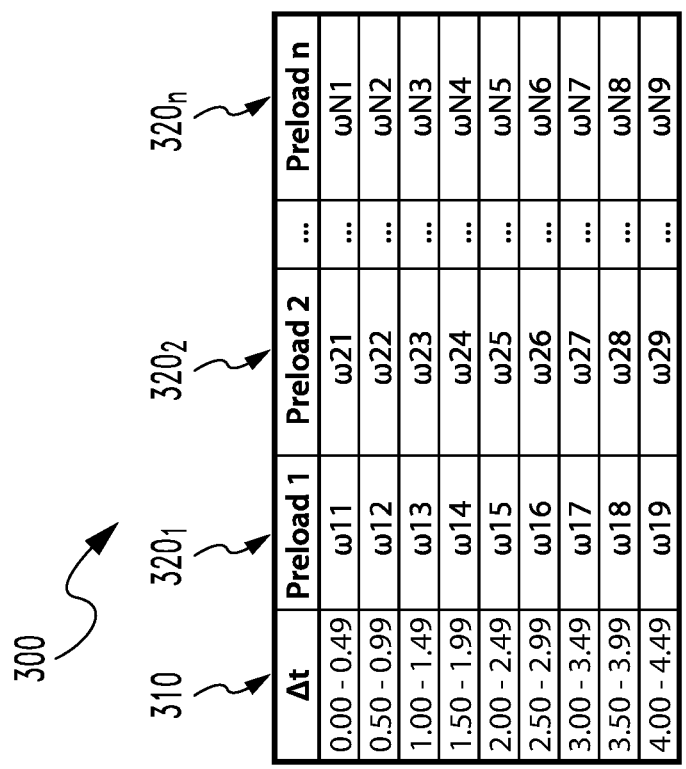
FIG. 5 illustrates a lookup table according to certain embodiments.

With additional reference to FIG. 5, illustrated therein is an example lookup table 300 that may be utilized in block 218 to determine the target speed $\omega_{max}$. The lookup table 300 includes a time column 310 and one or more maximum speed columns, illustrated as $320_1, 320_2 \ldots 320_n$. It should be appreciated that while the illustrated lookup table 300 has increments of 0.5 seconds for the time duration Δt, larger or smaller increments may be utilized to provide more or less granularity as desired. In the illustrated form, each of the maximum speed columns corresponds to a respective force profile for the spring 98, which as noted above may be determined in block 212. In such forms, block 218 may involve selecting the acceptable motor torque profile based on the time duration Δt and the force profile calculated in block 212. For example, if it is determined that the preload of the spring 98 is at its minimum value and the time duration Δt is 2.2 seconds, block 218 may involve selecting speed $\omega_{15}$ as the maximum speed $\omega_{max}$. If it is determined that the preload of the spring 98 corresponds to one turn beyond the minimum and the time duration is 3.8 seconds, then block 218 may involve speed $\omega_{28}$ as the maximum speed $\omega_{max}$. As another example, if it is determined that the preload of the spring 98 is at its maximum value and the time duration Δt is 4.4 seconds, block 218 may involve selecting speed $\omega_{N9}$ as the maximum speed $\omega_{max}$.

While the illustrated lookup table 300 includes multiple columns corresponding to different force profiles of the spring 98, it is also contemplated that the lookup table 300 may include a single speed column, for example in embodiments in which the force profile of the spring 98 is fixed and non-adjustable and/or embodiments in which the spring 98 is omitted. In such forms, block 218 may involve simply selecting the maximum speed $\omega_{max}$ based on the time duration Δt, the MMI, or a calculated value corresponding to one or both of the time duration Δt and/or the MMI.

As noted above, the maximum speed $\omega_{max}$ may be one that ensures that the door speed $\omega_{door}$ remains low enough to ensure that the kinetic energy of the door 74 remains below a threshold kinetic energy. In certain embodiments, the threshold kinetic energy may be set by an applicable standard, such as the BHMA 156.19 standard. In certain embodiments, the threshold kinetic energy may be about 1.25 lbf-ft, or about 1.7 N-m. Armed with the present disclosure, those skilled in the art will readily be able to derive one or more look-up tables and/or one or more equations relating the time duration $\Delta t$ to the appropriate maximum speed $\omega_{max}$.

As noted above, the illustrated process 200 further includes an operation procedure 220, which generally involves performing at least one operation based upon the maximum speed $\omega_{max}$. In certain embodiments, the operation procedure 220 includes block 222, which generally involves receiving a user selection of a target door speed $\omega_{target}$. Block 222 may, for example, involve the controller 142 receiving the user selection of the target door speed $\omega_{target}$ via the user interface 148 and/or another device.

In certain forms, the target door speed $\omega_{target}$ may be provided as an absolute speed value. For example, the user interface 148 may facilitate user selection of an absolute speed value from a set of available absolute speed values. By way of illustration, the user interface 148 may facilitate user selection of the target speed value from a set of values ranging from 10° per second to 30° per second. In such forms, the controller 142 may utilize closed-loop control based upon information received from the position sensor 144 to ensure that the speed of the door 74 ramps up to the selected absolute speed value. In certain embodiments, the door speed may be limited based upon the maximum speed $\omega_{max}$ as described herein.

In certain forms, the target door speed $\omega_{target}$ may correspond to a target pulse width modulation (PWM) duty cycle for the motor 120. For example, the user interface 148 may facilitate user selection of a duty cycle from a set of available absolute speed values. By way of illustration, the user interface 148 may facilitate user selection of the target duty cycle from a set of values ranging from 40% to 100%. In such forms, the controller 142 may utilize open-loop control to ramp the PWM duty cycle for the motor 120 up to the selected duty cycle. In certain embodiments, the door speed may be limited based upon the maximum speed $\omega_{max}$ as described herein.

In certain embodiments, the operation procedure 220 may include block 224, which generally involves providing a warning if the target door speed $\omega_{target}$ selected by the user exceeds or is expected to exceed the maximum speed $\omega_{max}$. For example, if the maximum speed $\omega_{max}$ for the door 74 is determined to be 20° per second and the user selects a target speed $\omega_{target}$ of 25°, the controller 148 may cause the user interface 148 to provide a visual warning (e.g., a red light) and/or an audible warning (e.g., a tone or spoken message). This may prompt the user to select a lower target speed $\omega_{target}$ in order to comply with the applicable standard(s).

In certain embodiments, the operation procedure 220 may include block 226, which generally involves limiting the door speed $\omega_{door}$ to the maximum speed $\omega_{max}$. For example, if the controller 148 determines (e.g., based upon information received from the position sensor 148) that the door speed $\omega_{door}$ exceeds the maximum speed $\omega_{max}$, the controller 148 may dynamically adjust the duty cycle to ensure that the door speed door speed $\omega_{door}$ does not exceed the maximum speed $\omega_{max}$.

Figure 6:
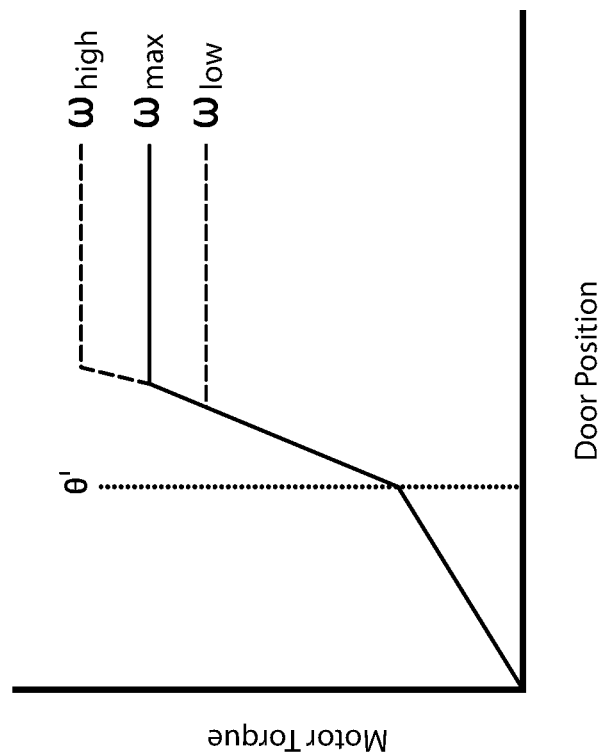
FIG. 6 is a graph illustrating door speed versus door position according to certain embodiments.

With additional reference to FIG. 6, illustrated therein is an example position-speed diagram for the door 74. In certain embodiments, a "soft start" may be utilized, in which the duty cycle for the motor 120 is ramped up for a predetermined time and/or until the door 74 reaches a predetermined angular position $\theta'$. In certain embodiments, the ramp-up acceleration, and/or the predetermined time or the predetermined position $\theta'$ may be selected by the user.

Following the optional soft-start, the duty cycle of the motor 120 may be increased to accelerate the door 74 to its target speed $\omega_{target}$. In certain forms, such as those in which the operator 80 provides a warning in response to the selected target speed $\omega_{target}$ exceeding the maximum speed $\omega_{max}$, the controller 142 may permit the door 74 to accelerate to the target speed $\omega_{target}$ despite the target speed $\omega_{target}$ exceeding the calculated maximum speed $\omega_{max}$, as illustrated in association with $\omega_{high}$. In other embodiments, the controller 142 may operate the motor 120 such that the door speed $\omega_{door}$ is limited to the calculated maximum speed $\omega_{max}$. In situations where the target speed $\omega_{target}$ is lower than the maximum speed $\omega_{max}$, the controller 142 may simply allow the door 74 to accelerate to its target speed $\omega_{target}$, as illustrated in association with $\omega_{low}$.

In certain forms, the operation procedure 220 may involve driving the door 74 toward a target position. In certain embodiments, the target position may be an open position. In such forms, block 222 may involve operating the motor 120 in response to actuation of the actuator 84. In certain embodiments, the target position may be a closed position. In such forms, block 222 may involve operating the motor 120 in response to the door 74 reaching a particular position and/or in response to a predetermined hold-open time expiring.

As noted above, blocks may be combined or divided, and added or removed, as well as re-ordered in whole or in part. As one example, the determination of the maximum speed $\omega_{max}$ in block 210 may be performed as part of a normal door movement operation. By way of illustration, an initial phase of the door movement may be performed with a known torque profile to accelerate the door 74 to the target speed $\omega_{target}$, and the time duration may be monitored to determine a maximum speed $\omega_{max}$ for the remainder of the door movement. This maximum speed $\omega_{max}$ may then be used for subsequent door movements, or may be recalculated during each door movement.

Figure 7:
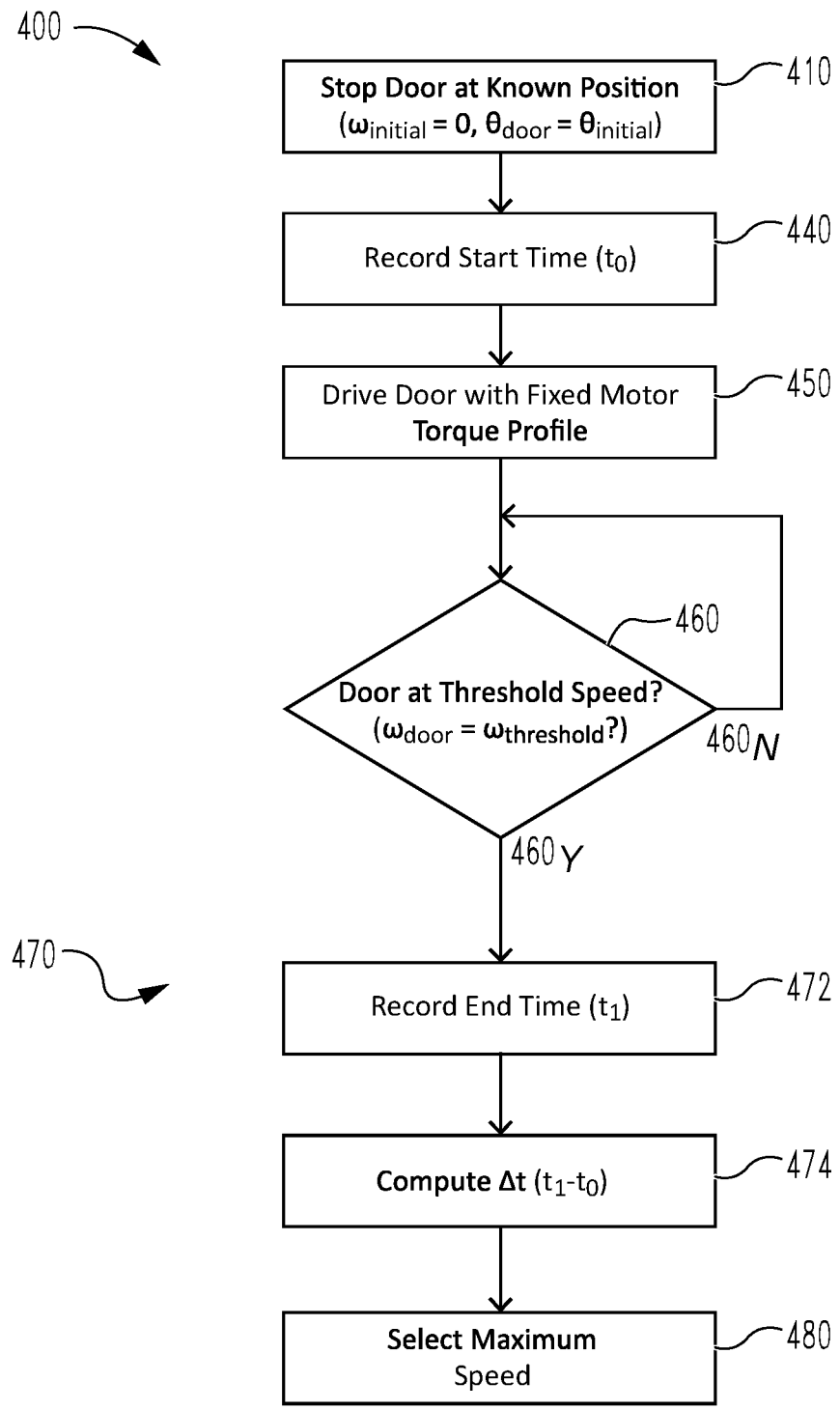
FIG. 7 is a schematic flow diagram of a process according to certain embodiments.

With additional reference to FIG. 7, an exemplary process 400 that may be performed using the door operator 80 is illustrated. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 400 may be performed wholly by control assembly 140, or that the blocks may be distributed among one or more of the elements and/or additional devices or systems that are not specifically illustrated in FIGS. 1-3. Additionally, while the blocks are illustrated in a relatively serial fashion, it is to be understood that two or more of the blocks may be performed concurrently or in parallel with one another. Moreover, while the process 400 is described herein with specific reference to the closure assembly 70 and door operator 80 illustrated in FIGS. 1-3, it is to be appreciated that the process 400 may be performed with closure assemblies 70 and/or door operators 80 having additional and/or alternative features.

As described herein, the process 400 is an example implementation of the above-described calibration procedure 210, and may, for example, be performed in connection with the above-described process 200. It is also contemplated that the process 400 may be performed in connection with other processes and/or as a standalone process.

The illustrated process 400 includes block 410, which generally involves stopping the door 74 at a known initial position $\theta_{initial}$ such that the initial speed $\omega_{initial}$ is equal to zero. In certain embodiments, block 410 may involve supplying the motor 120 with a first current to move the door 74 to the initial position $\theta_{initial}$, and then supplying the motor 120 with a holding current to hold the door 74 at the initial position $\theta_{initial}$. It is also contemplated that block 410 may involve the user manually driving the door 74 to the initial position, after which the holding current may be supplied to the motor 120.

The process 400 also includes block 440, which generally involves initiating measurement of the time duration. In the illustrated form, block 440 involves noting the start time $t_0$, for example based on information received from a clock of the timing device 146. It is also contemplated that block 440 may involve initiating measurement of the time duration in another manner, such as by starting a timer of the timing device 146.

The process 400 also includes block 450, which generally involves operating the motor 120 with a known motor torque profile to alter the door speed $\omega_{door}$. In the illustrated form, the known motor torque profile is a fixed motor torque profile. In other forms, the known motor torque profile may be a variable motor torque profile, for example as described above.

The process 400 also includes block 460, which generally involves monitoring the door speed $\omega_{door}$. More particularly, block 460 is provided as a conditional in which the door speed $\omega_{door}$ is compared to the known threshold door speed $\omega_{threshold}$. If the door speed $\omega_{door}$ does not correspond to the threshold speed $\omega_{threshold}$, the conditional 460 continues as indicated by path 460N. If the door speed $\omega_{door}$ corresponds to the threshold speed $\omega_{threshold}$, the process 400 continues to block 470, as indicated by path 460Y.

In response to the door speed $\omega_{door}$ corresponding to the threshold speed $\omega_{threshold}$, measurement of the time duration is ceased in block 470 such that the value of the time duration $\Delta t$ is known. In the illustrated form, determining the value of the time duration $\Delta t$ involves recording the end time $t_1$ in block 472, and calculating the time duration $\Delta t$ as the difference of $t_1$ and $t_0$ in block 474. It is also contemplated that block 470 may involve stopping a timer of the timing device 146 such that the time duration $\Delta t$ corresponds to the final value of the timer.

The process 400 also includes block 480, which generally involves selecting the acceptable motor torque profile based on the time duration $\Delta t$, for example as described above. While not specifically illustrated, it should be appreciated that the process 400 may involve determining the force profile of the spring 98. In such forms, block 480 may involve selecting the acceptable motor torque profile based on the time duration $\Delta t$ and the force profile of the spring 98, for example as described above.

Figure 8:
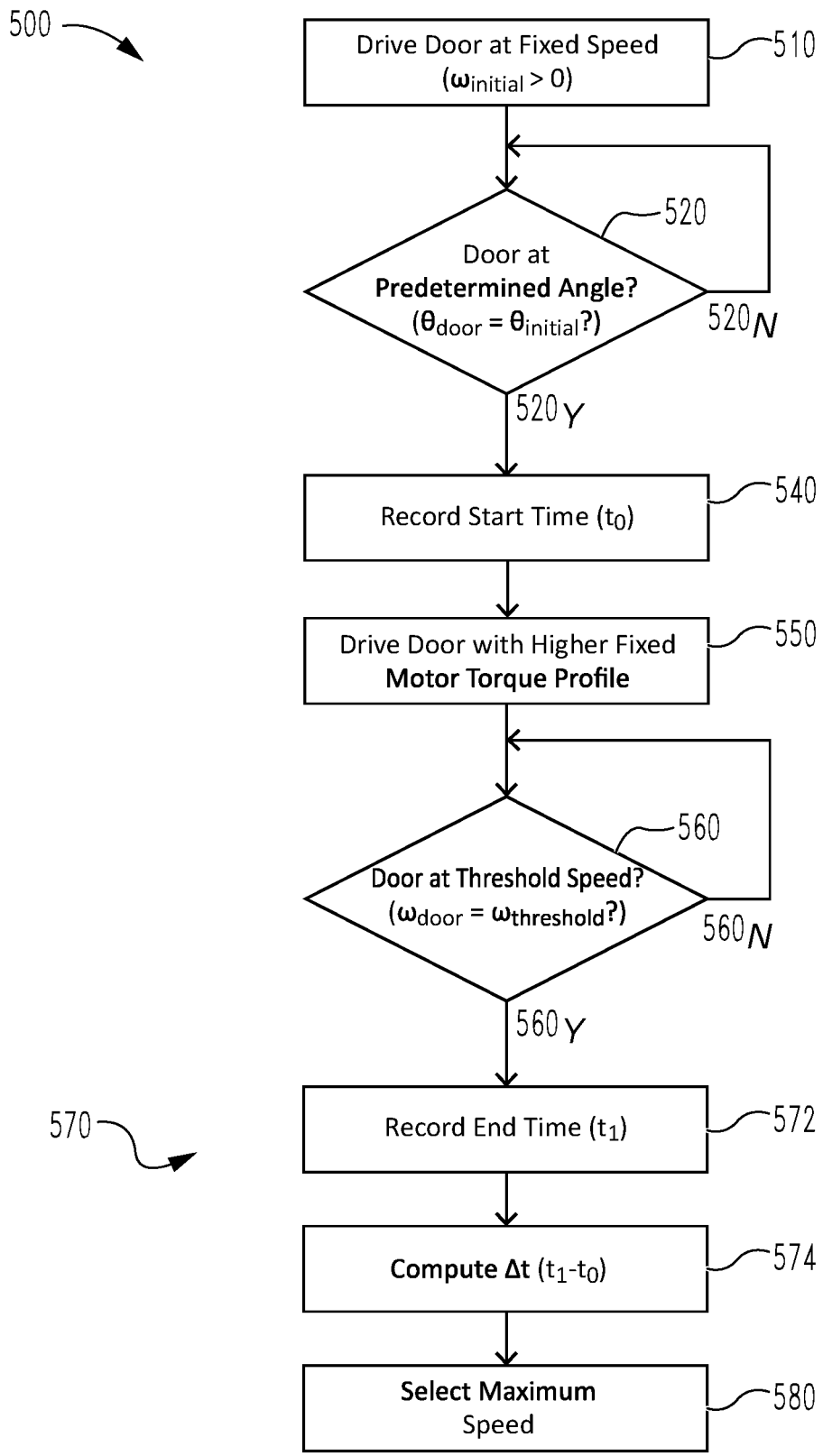
FIG. 8 is a schematic flow diagram of a process according to certain embodiments.

With additional reference to FIG. 8, an exemplary process 500 that may be performed using the door operator 80 is illustrated. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 500 may be performed wholly by control assembly 140, or that the blocks may be distributed among one or more of the elements and/or additional devices or systems that are not specifically illustrated in FIGS. 1-3. Additionally, while the blocks are illustrated in a relatively serial fashion, it is to be understood that two or more of the blocks may be performed concurrently or in parallel with one another. Moreover, while the process 500 is described herein with specific reference to the closure assembly 70 and door operator 80 illustrated in FIGS. 1-3, it is to be appreciated that the process 500 may be performed with closure assemblies 70 and/or door operators 80 having additional and/or alternative features.

As described herein, the process 500 is an example implementation of the above-described calibration procedure 210, and may, for example, be performed in connection with the above-described process 200. It is also contemplated that the process 500 may be performed in connection with other processes and/or as a standalone process.

The illustrated process 500 includes block 510, which generally involves operating the motor 120 to drive the door 74 open at a fixed initial speed $\omega_{initial}$. Block 510 may, for example, involve operating the motor 120 with a first motor torque profile configured to cause the door 74 to open with the predetermined initial speed $\omega_{initial}$.

The process 500 includes block 520, which generally involves monitoring the door position $\theta_{door}$, for example via the position sensor 144. In the illustrated form, block 520 is a provided as a conditional in which the door position $\theta_{door}$ is compared to the predetermined initial door position $\theta_{initial}$. If the door position $\theta_{door}$ does not correspond to the predetermined initial door position $\theta_{initial}$, the conditional 520 continues as indicated by path 520N. If the door position $\theta_{door}$ corresponds to the predetermined initial door position $\theta_{initial}$, the process 500 continues to block 540 as indicated by path 520Y.

The process 500 also includes block 540, which generally involves initiating measurement of the time duration. In the illustrated form, block 540 involves noting the start time $t_0$, for example based on information received from a clock of the timing device 146. It is also contemplated that block 540 may involve initiating measurement of the time duration in another manner, such as by starting a timer of the timing device 146.

The process 500 also includes block 550, which generally involves operating the motor 120 with a known motor torque profile to alter the door speed $\omega_{door}$. More particularly, in the illustrated form, block 550 involves increasing the torque of the motor 120 to thereby accelerate the door 74 such that the door speed $\omega_{door}$ increases. Thus, in the current embodiment, the threshold speed $\omega_{threshold}$ is greater than the initial speed $\omega_{initial}$. In certain forms, the known motor torque profile may be a fixed motor torque profile. In other forms, the known motor torque profile may be a variable motor torque profile, for example as described above.

The process 500 also includes block 560, which generally involves monitoring the door speed $\omega_{door}$. In the illustrated form, block 560 is provided as a conditional in which the door speed $\omega_{door}$ is compared to the known threshold speed $\omega_{threshold}$. If the door speed $\omega_{door}$ does not correspond to the threshold speed $\omega_{threshold}$, the conditional 560 continues as indicated by path 560N. If the door speed $\omega_{door}$ corresponds to the threshold speed $\omega_{threshold}$, the process 500 continues to block 570, as indicated by path 560Y.

In response to the door speed $\omega_{door}$ corresponding to the threshold speed $\omega_{threshold}$, measurement of the time duration $\Delta t$ is ceased in block 570 such that the value of the time duration $\Delta t$ is known. In the illustrated form, determining the value of the time duration $\Delta t$ involves recording the end time $t_1$ in block 572, and calculating the time duration $\Delta t$ as the difference of $t_1$ and to in block 574. It is also contemplated that block 570 may involve stopping a timer of the timing device 146 such that the time duration $\Delta t$ corresponds to the final value of the timer.

The process 500 also includes block 580, which generally involves selecting the acceptable motor torque profile based on the time duration $\Delta t$, for example as described above.

While not specifically illustrated, it should be appreciated that the process 500 may involve determining the force profile of the spring 98. In such forms, block 580 may involve selecting the acceptable motor torque profile based on the time duration Δt and the force profile of the spring 98, for example as described above.

Figure 9:
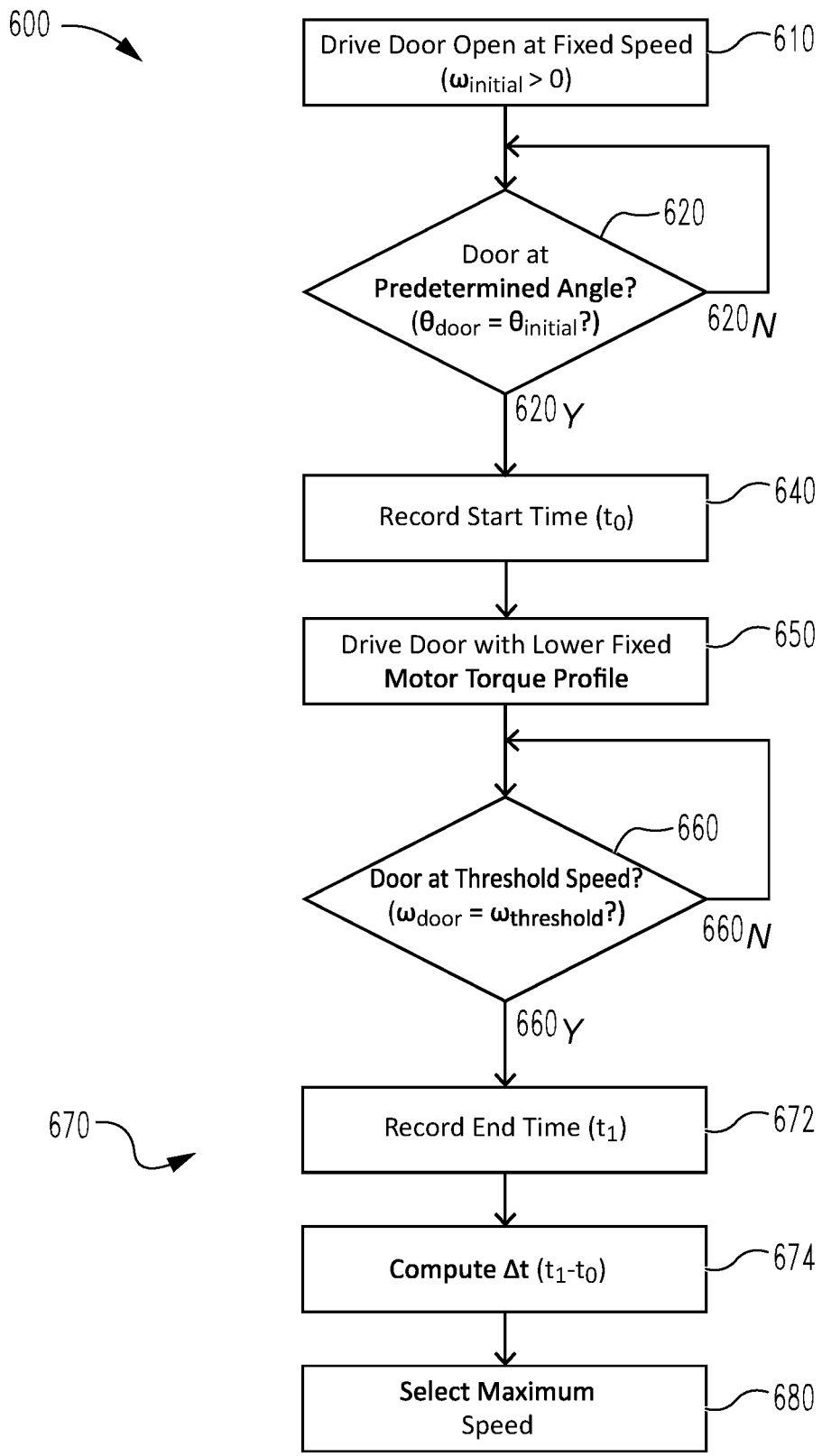
FIG. 9 is a schematic flow diagram of a process according to certain embodiments.

With additional reference to FIG. 9, an exemplary process 600 that may be performed using the door operator 80 is illustrated. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 600 may be performed wholly by control assembly 140, or that the blocks may be distributed among one or more of the elements and/or additional devices or systems that are not specifically illustrated in FIGS. 1-3. Additionally, while the blocks are illustrated in a relatively serial fashion, it is to be understood that two or more of the blocks may be performed concurrently or in parallel with one another. Moreover, while the process 600 is described herein with specific reference to the closure assembly 70 and door operator 80 illustrated in FIGS. 1-3, it is to be appreciated that the process 600 may be performed with closure assemblies 70 and/or door operators 80 having additional and/or alternative features.

As described herein, the process 600 is an example implementation of the above-described calibration procedure 210, and may, for example, be performed in connection with the above-described process 200. It is also contemplated that the process 600 may be performed in connection with other processes and/or as a standalone process.

The illustrated process 600 includes block 610, which generally involves operating the motor 120 to drive the door 74 open at a fixed initial speed $\omega_{initial}$. Block 610 may, for example, involve operating the motor 120 with a first motor torque profile configured to cause the door 74 to open with the predetermined initial speed $\omega_{initial}$.

The process 600 includes block 620, which generally involves monitoring the door position $\theta_{door}$, for example via the position sensor 144. In the illustrated form, block 620 is a provided as a conditional in which the door position $\theta_{door}$ is compared to the predetermined initial door position $\theta_{initial}$. If the door position $\theta_{door}$ does not correspond to the predetermined initial door position $\theta_{initial}$, the conditional 620 continues as indicated by path 620N. If the door position $\theta_{door}$ corresponds to the predetermined initial door position $\theta_{initial}$, the process 600 continues to block 640 as indicated by path 620Y.

The process 600 also includes block 640, which generally involves initiating measurement of the time duration. In the illustrated form, block 640 involves noting the start time $t_0$, for example based on information received from a clock of the timing device 146. It is also contemplated that block 640 may involve initiating measurement of the time duration in another manner, such as by starting a timer of the timing device 146.

The process 600 also includes block 650, which generally involves operating the motor 120 with a known motor torque profile to alter the door speed $\omega_{door}$. More particularly, in the illustrated form, block 650 involves decreasing the torque of the motor 120 to thereby decelerate the door 74 such that the door speed $\omega_{door}$ decreases. Thus, in the current embodiment, the threshold speed $\omega_{threshold}$ is less than the initial speed $\omega_{initial}$. In certain embodiments, the threshold speed $\omega_{threshold}$ may be zero. In the illustrated form, the known motor torque profile is a fixed motor torque profile, and may involve operating the motor 120 to generate zero torque. In other forms, the known motor torque profile may be a variable motor torque profile and/or may involve operating the motor 120 to provide a non-zero torque.

The process 600 also includes block 660, which generally involves monitoring the door speed $\omega_{door}$. In the illustrated form, block 660 is provided as a conditional in which the door speed $\omega_{door}$ is compared to the known threshold speed $\omega_{threshold}$. If the door speed $\omega_{door}$ does not correspond to the threshold speed $\omega_{threshold}$, the conditional 660 continues as indicated by path 660N. If the door speed $\omega_{door}$ corresponds to the threshold speed $\omega_{threshold}$, the process 600 continues to block 670, as indicated by path 660Y.

In response to the door speed $\omega_{door}$ corresponding to the threshold speed $\omega_{threshold}$, measurement of the time duration is ceased in block 670 such that the value of the time duration Δt is known. In the illustrated form, determining the value of the time duration Δt involves recording the end time $t_1$ in block 672, and calculating the time duration Δt as the difference of $t_1$ and $t_0$ in block 674. It is also contemplated that block 670 may involve stopping a timer of the timing device 146 such that the time duration Δt corresponds to the final value of the timer.

The process 600 also includes block 680, which generally involves selecting the acceptable motor torque profile based on the time duration Δt, for example as described above. While not specifically illustrated, it should be appreciated that the process 600 may involve determining the force profile of the spring 98. In such forms, block 680 may involve selecting the acceptable motor torque profile based on the time duration Δt and the force profile of the spring 98, for example as described above.

It should be appreciated that one or more of the above-described processes 200, 400, 500, 600 may be performed by an appropriately programmed door operator, such as the door operator 80. Indeed, certain embodiments of the present application relate to a door operator configured to perform calibration and operation procedures along the lines described hereinabove. For example, a door operator 80 according to certain embodiments generally includes a body 92, a pinion 94 rotatably mounted to the body 92, a position sensor 144 operable to sense a position of the pinion 94, a motor 120 operable to exert a torque on the pinion 94, a controller 142 in communication with the position sensor 144 and the motor 120, and memory 143 in communication with the controller 142.

In certain forms, the memory 143 comprises instructions that, when executed by the controller 142, cause the door operator 80 to perform a calibration procedure and/or an operation procedure. The calibration procedure generally includes initiating measurement of a time duration Δt at an initial time $t_0$ at which the pinion 94 has an initial rotational speed, ceasing measurement of the time duration Δt in response to the pinion reaching a target rotational speed, and determining an acceptable motor torque profile based on the time duration Δt. Additionally, the operation procedure generally involves operating the motor 120 according to the acceptable motor torque profile to thereby drive the pinion 94 toward a target position. When the door operator 80 is installed to a closure assembly along the lines of the closure assembly 70, the calibration procedure will result in selection of a motor torque profile that causes the door 74 to move toward the target position at an acceptable speed during performance of the operation procedure.

As should be appreciated from the foregoing, the subject matter described herein may aid in ensuring compliance with an applicable standard, such as the BHMA 156.19 standard for low-power auto-operators. More particularly, the subject matter described herein may enable a door operator 80 to automatically determine a parameter corresponding to the MIMI of the door 74 and select a motor torque profile for subsequent operation of the door 74, which may obviate the need for the installer to tune the operator 80 manually. In certain embodiments, the parameter corresponding to the MMI of the door 74 is the time duration $\Delta t$ required to accelerate or decelerate the door 74 by a known speed difference $\Delta \omega$ when a known motor torque is provided.

Figure 10:
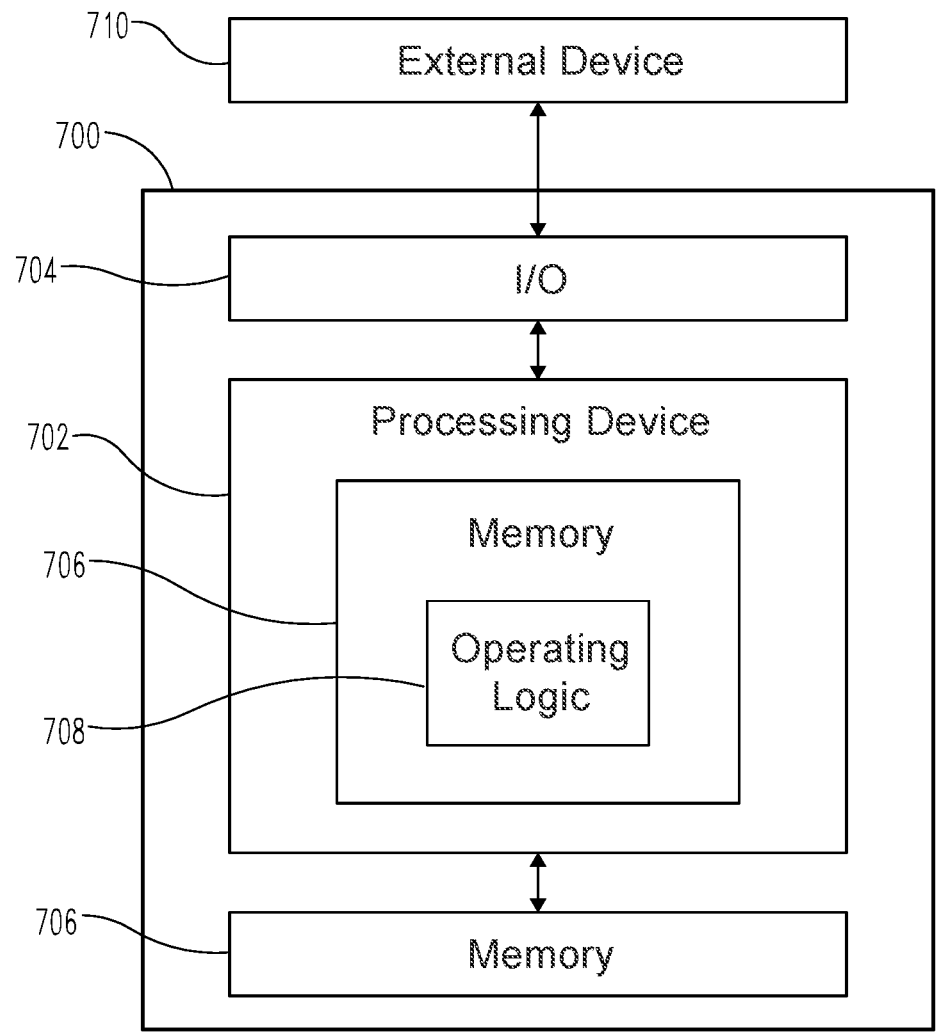
FIG. 10 is a schematic block diagram of a computing device that may be utilized in connection with certain embodiments.

Referring now to FIG. 10, a simplified block diagram of at least one embodiment of a computing device 700 is shown. The illustrative computing device 700 depicts at least one embodiment of a controller that may be utilized in connection with the controller 142 illustrated in FIG. 3.

Depending on the particular embodiment, the computing device 700 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 700 includes a processing device 702 that executes algorithms and/or processes data in accordance with operating logic 708, an input/output device 704 that enables communication between the computing device 700 and one or more external devices 710, and memory 706 which stores, for example, data received from the external device 710 via the input/output device 704.

The input/output device 704 allows the computing device 700 to communicate with the external device 710. For example, the input/output device 704 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 700. The input/output device 704 may include hardware, software, and/or firmware suitable for performing the techniques described herein.

The external device 710 may be any type of device that allows data to be inputted or outputted from the computing device 700. For example, in various embodiments, the external device 710 may be embodied as the actuator 84, the motor 120, the memory 143, the position sensor 144, the timing device 146, and/or the user interface 148. Further, in some embodiments, the external device 710 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 710 may be integrated into the computing device 700.

The processing device 702 may be embodied as any type of processor(s) capable of performing the functions described herein. In particular, the processing device 702 may be embodied as one or more single or multi-core processors, microcontrollers, or other processor or processing/controlling circuits. For example, in some embodiments, the processing device 702 may include or be embodied as an arithmetic logic unit (ALU), central processing unit (CPU), digital signal processor (DSP), and/or another suitable processor(s). The processing device 702 may be a programmable type, a dedicated hardwired state machine, or a combination thereof. Processing devices 702 with multiple processing units may utilize distributed, pipelined, and/or parallel processing in various embodiments. Further, the processing device 702 may be dedicated to performance of just the operations described herein, or may be utilized in one or more additional applications. In the illustrative embodiment, the processing device 702 is of a programmable variety that executes algorithms and/or processes data in accordance with operating logic 708 as defined by programming instructions (such as software or firmware) stored in memory 706. Additionally or alternatively, the operating logic 708 for processing device 702 may be at least partially defined by hardwired logic or other hardware. Further, the processing device 702 may include one or more components of any type suitable to process the signals received from input/output device 704 or from other components or devices and to provide desired output signals. Such components may include digital circuitry, analog circuitry, or a combination thereof.

The memory 706 may be of one or more types of non-transitory computer-readable media, such as a solid-state memory, electromagnetic memory, optical memory, or a combination thereof. Furthermore, the memory 706 may be volatile and/or nonvolatile and, in some embodiments, some or all of the memory 706 may be of a portable variety, such as a disk, tape, memory stick, cartridge, and/or other suitable portable memory. In operation, the memory 706 may store various data and software used during operation of the computing device 700 such as operating systems, applications, programs, libraries, and drivers. It should be appreciated that the memory 706 may store data that is manipulated by the operating logic 708 of processing device 702, such as, for example, data representative of signals received from and/or sent to the input/output device 704 in addition to or in lieu of storing programming instructions defining operating logic 708. As illustrated, the memory 706 may be included with the processing device 702 and/or coupled to the processing device 702 depending on the particular embodiment. For example, in some embodiments, the processing device 702, the memory 706, and/or other components of the computing device 700 may form a portion of a system-on-a-chip (SoC) and be incorporated on a single integrated circuit chip.

In some embodiments, various components of the computing device 700 (e.g., the processing device 702 and the memory 706) may be communicatively coupled via an input/output subsystem, which may be embodied as circuitry and/or components to facilitate input/output operations with the processing device 702, the memory 706, and other components of the computing device 700. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 700 may include other or additional components, such as those commonly found in a typical computing device (e.g., various input/output devices and/or other components), in other embodiments. It should be further appreciated that one or more of the components of the computing device 700 described herein may be distributed across multiple computing devices. In other words, the techniques described herein may be employed by a computing system that includes one or more computing devices. Additionally, although only a single processing device 702, I/O device 704, and memory 706 are illustratively shown in FIG. 10, it should be appreciated that a particular computing device 700 may include multiple processing devices 702, I/O devices 704, and/or memories 706 in other embodiments. Further, in some embodiments, more than one external device 710 may be in communication with the computing device 700.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of operating a door operator coupled to a door, wherein the door operator comprises a motor operable to move the door in at least one direction and a controller operable to control the motor, the method comprising:
    performing a calibration procedure, the calibration procedure comprising:
        with the door at a first position and the door having an initial speed of zero, initiating, by the controller, measurement of a time duration;
        in response to the door reaching a threshold speed different from the initial speed, ceasing, by the controller, measurement of the time duration; and
        determining, by the controller, a maximum speed based upon the time duration, wherein the maximum speed is a maximum allowable speed for the door; and
    subsequent to the calibration procedure, performing at least one operation based upon the maximum speed.

2. The method of claim 1, further comprising:
    during the time duration, driving the door toward a second position; and
    wherein driving the door toward the second position comprises operating the motor with a known motor torque profile to thereby alter a speed of the door.

3. The method of claim 1, wherein the initial speed is less than the threshold speed; and
    wherein the calibration procedure further comprises:
        during the time duration, operating the motor with a known motor torque profile to thereby increase a speed of the door.

4. The method of claim 1, wherein the initial speed is greater than the threshold speed.

5. The method of claim 1, wherein the calibration procedure further comprises:
    during the time duration, operating the motor with a known motor torque profile to thereby alter a speed of the door.

6. The method of claim 1, further comprising calculating a parameter based upon the time duration; and
    wherein determining the maximum speed based upon the time duration comprises determining the maximum speed based upon the parameter.

7. The method of claim 1, wherein the method further comprises:
    generating, by a position sensor of the door operator, position information related to a current position of the door; and
    determining that the door has reached the threshold speed based upon the position information.

8. The method of claim 1, wherein the door operator comprises a spring biasing the door toward a closed position;
    wherein the calibration procedure further comprises determining a force profile of the spring; and
    wherein determining the maximum speed based upon the time duration comprises determining the maximum speed based upon the time duration and the force profile of the spring.

9. The method of claim 1, wherein the at least one operation comprises limiting a door speed of the door to the maximum speed.

10. The method of claim 1, wherein the at least one operation comprises:
    receiving, via a user interface of the door operator, a user selection of a target speed; and
    providing a warning in response to the target speed exceeding the maximum speed.

11. The method of claim 1, wherein the door operator further comprises a body and a pinion rotatably mounted to the body;
    wherein the motor is operable to exert a torque on the pinion;
    wherein the initiating measurement of the time duration is at an initial time at which the pinion has an initial rotational speed; and
    wherein the ceasing measurement of the time duration is in response to the pinion reaching a threshold rotational speed.

12. The method of claim 1, wherein the door operator further comprises a spring; and
    wherein determining the maximum speed based upon the time duration comprises determining the maximum speed based upon the time duration and a force profile of the spring.

13. The method of claim 1, further comprising limiting a rotational speed of the pinion based upon the maximum speed.

14. The method of claim 1, further comprising operating the motor with a known motor torque profile for the time duration.

15. The method of claim 1, wherein performing the calibration procedure further comprises calculating a mass moment of inertia parameter based upon the time duration; and wherein determining the maximum speed based upon the time duration comprises determining the maximum speed based upon the mass moment of inertia parameter.

16. The method of claim 1, further comprising providing a warning in response to a user-selected speed exceeding the maximum speed.

17. The method of claim 3, wherein the calibration procedure further comprises:
prior to initiating measurement of the time duration, operating the motor to drive the door to the first position with the initial speed.

18. The method of claim 6, wherein the parameter is a mass moment of inertia of the door.

19. The method of claim 14, further comprising generating, by the motor, a non-zero torque during at least a portion of the time duration.

20. A method of operating a door operator coupled to a door, wherein the door operator comprises a motor operable to move the door in at least one direction and a controller operable to control the motor, the method comprising:
performing a calibration procedure, the calibration procedure comprising:
with the door at a first position and the door having an initial speed of zero, initiating, by the controller, measurement of a time duration;
in response to the door reaching a threshold speed greater than the initial speed, ceasing, by the controller, measurement of the time duration; and
determining, by the controller, a maximum allowable speed for the door based upon the time duration and a difference between the threshold speed and the initial speed; and
subsequent to the calibration procedure, performing at least one of a first operation or a second operation;
wherein the first operation comprises providing a warning in response to a user-selected door speed exceeding the maximum allowable speed for the door; and
wherein the second operation comprises limiting a speed of the door to the maximum allowable speed for the door.

21. The method of claim 20, wherein performing at least one of the first operation or the second operation comprises performing the first operation.

22. The method of claim 20, wherein performing at least one of the first operation or the second operation comprises performing the second operation.

* * * * *